United States Patent [19]
King

[11] 3,904,464
[45] Sept. 9, 1975

[54] PROCESS FOR MAKING THREE-DIMENSIONAL FABRIC MATERIAL

[75] Inventor: Robert W. King, Chelmsford, Mass.

[73] Assignee: Avco Corporation, Cincinnati, Ohio

[22] Filed: Jan. 24, 1972

[21] Appl. No.: 220,520

Related U.S. Application Data

[62] Division of Ser. No. 675,367, Oct. 16, 1967, abandoned.

[52] U.S. Cl. ............... 156/148; 139/408; 156/166; 156/173; 156/174; 156/296; 161/88; 161/89; 161/90; 161/93; 161/94
[51] Int. Cl.² ........................................ B31C 13/00
[58] Field of Search ............. 156/72, 148, 166, 173, 156/174, 296; 161/55, 59, 88, 89, 90, 93, 94; 139/408, 409, 419, 11

[56] References Cited
UNITED STATES PATENTS
| | | | |
|---|---|---|---|
| 2,495,808 | 1/1950 | Colmant | 161/57 |
| 3,322,868 | 5/1967 | Kruse et al. | 156/296 |

*Primary Examiner*—Leland A. Sebastian
*Attorney, Agent, or Firm*—Charles M. Hogan, Esq.; Abraham Ogman, Esq.

[57] ABSTRACT

Three-dimensional impregnated filamentary materials and methods for making the same.

2 Claims, 8 Drawing Figures

PROCESS FOR MAKING THREE-DIMENSIONAL FABRIC MATERIAL

This is a division of application Ser. No. 675,367 filed Oct. 16, 1967 now abandoned.

This invention relates to new types of three-dimensional materials and new methods for fabricating these materials. More specifically it relates to structures composed of filaments which are woven in three-dimensional shapes and then impregnated with a suitable matrix substance such as plastic, resin or other solutions. After these impregnated structures are hardened by curing, they can then be machined to desired shapes. The filament and impregnating compositions and the weaving orientation of the filaments may be varied to provide the desired characteristics for the composite structure.

According to this invention, a three-dimensional structure is made by weaving filaments in a two-dimensional network on an oriented group of filaments which define a third dimensional reinforcement axis. For convenience, the two-dimensional network will be referred to as being woven in the X—Y axis, and the reinforcement axis as the Z axis. The term "weaving" is used here in a broad general sense to indicate a moving into close adjacency with and overlapping of adjacent filaments rather than requiring an interlacing of these filaments. It also includes the interlacing of these filaments. This weaving must be performed in a way such that the filaments are in close, touching contact with each other. In this way, the woven structure acquires self-supporting three-dimensional integrity because of the inter-yarn friction between adjacent filaments.

After the structure is woven in this manner, it is then impregnated with a suitable plastic, resin, ceramic or metallic or other matrix. The structure is then cured to produce a hard billet of composite material. This billet may then be machined to the desired final dimensions.

Because the structure comprises separate individual filaments in the X, Y and Z axes, a large variety of filaments are available to tailor the composite to the particular characteristics which are desired. For example, the reinforcement density and stiffness in each axis can be varied independently of the other axis by using different filament sizes, densities and filament groupings and also by changing filament compositions. Examples of suitable filament materials include glass, metallic, ceramic, synthetic, asbestos, jute and cotton filaments as well as boron and quartz filaments. Certain of these materials may also be graphitized to vary the electrical characteristics of filaments. In addition, the orientation of these filaments in the woven structure can be varied to control the physical characteristics of the material.

Likewise the composition of the matrix can be varied to change the characteristics of the structure. Thus, the properties of the material can be controlled through these variables to provide materials having precisely the characteristics required for the particular application.

In order to better understand this invention, it is helpful to briefly review its general background. The closest known analogous prior art are materials made from two-dimensional fabrics and/or fibres dispersed in a resin or plastic matrix. These materials differ from the invention disclosed herein in that they are basically a plastic or resin structure into which reinforcing fabrics or fibers have been added to enhance the physical properties of the plastic or resin structure. The fabric and fibers have no self-supporting three-dimensional integrity. Nor do they provide significant, if any, inter-yarn friction along the three orthogonal axes.

These prior art reinforced materials have the serious difficulty of lacking sufficient strength between one layer of fabric and its adjacent layers. The reinforcement effectively occurs in one plane only and is greatest within this plane in the two directions parallel to the interwoven yarns. Little or no reinforcement is present in the direction perpendicular to the fabric plane.

In contrast, the woven structure disclosed herein is free-standing, having three-dimensional integrity in all three axes. The matrix material is added for setting the filaments in their preselected orientation, and for enhancing the physical, thermal, ablative, and other properties of the woven filamentary materials. The basic strength of the fabric structure results primarily from interyarn friction of the adjacent filaments, where they intersect throughout the material. This friction provides the binding forces which maintain fabric integrity even in the absence of the plastic, resin or other type matrix.

It is therefore a principal object of this invention to provide three-dimensional materials (and methods for making them) which combine the advantages of the prior art reinforced materials without being subject to these materials' deficiencies of interlaminar weakness and susceptibility to planes or axes of weakness.

It is another object of this invention to provide a new class of materials, and a method for making these new materials, which have a composition that can be tailored to satisfy strength, thermal, electrical, ablating and other physical property requirements either isotropically or directionally in any of the three orthogonal axes.

This invention will be more fully understood from the following detailed description of the specific embodiments thereof when read in conjunction with the accompanying drawings, in which.

Figure 1:
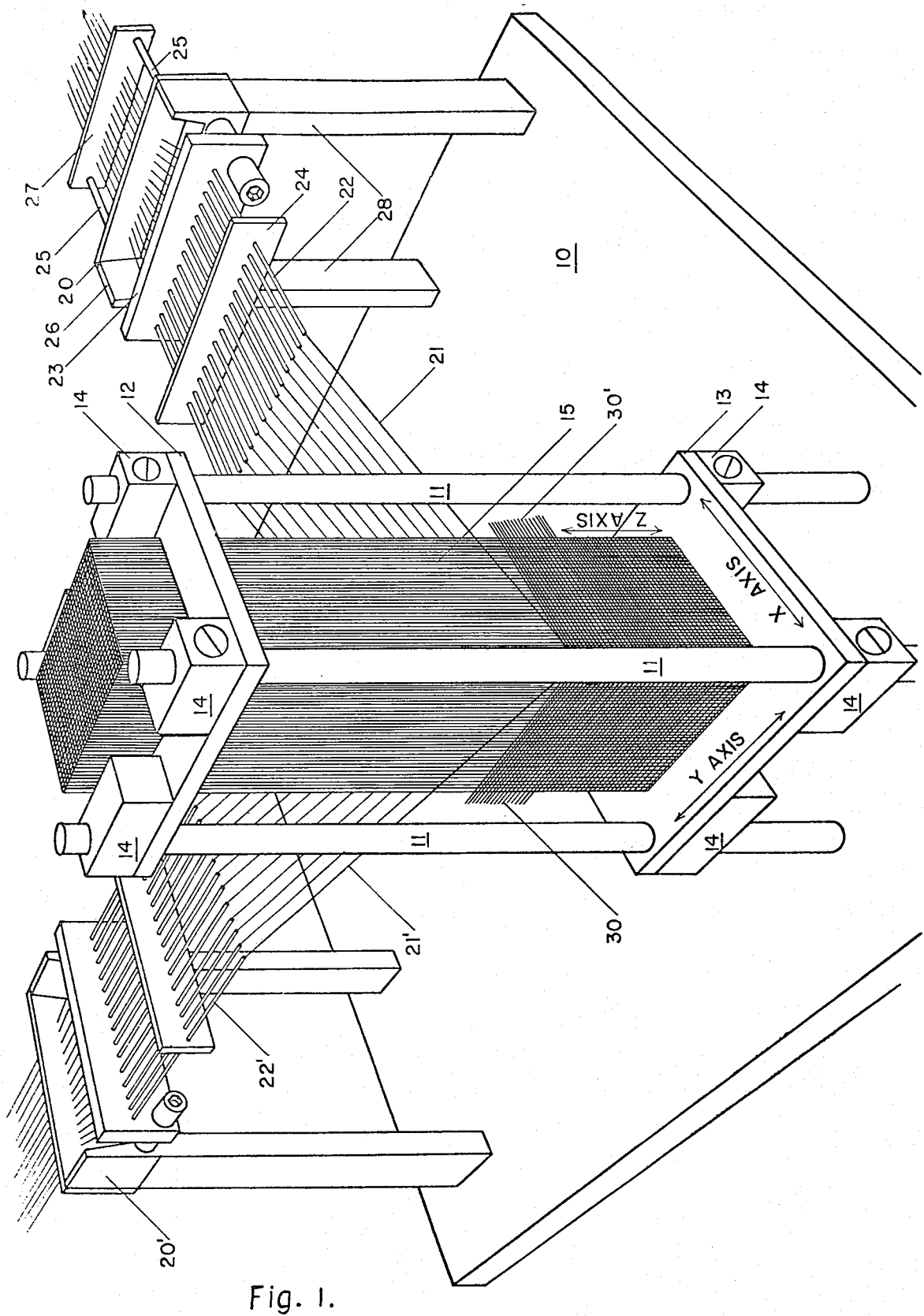
FIG. 1 is a pictorial representation of a loom for weaving three-dimensional fabric material in accordance with this invention.

Referring to FIG. 1, base 10 supports four aligned uprights 11 on which are movably mounted upper frame 12 and lower frame 13. Frames 12 and 13 are movably mounted to uprights 11 by conventional collar and set screw positioning means 14.

A plurality of vertically oriented filaments 15, which in this particular embodiment are rigid rods made of a self-supporting material such as boron, extend in what will be referred to as the Z axis between upper and lower frames 12 and 13. They are positioned in this way by passing through holes (not shown) in upper frame 12 and resting in mating recesses (not shown) in the upper surface of lower frame 13. The holes and recesses in frames 12 and 13 are oriented and spaced in this embodiment in equally spaced perpendicular ranks and rows, thus defining mutually perpendicular axes X and Y. These axes are so indicated in FIG. 1.

While filaments 15 in this particular embodiment are self-supporting boron rods, it should be understood that other filaments made of materials as referred to above, some of which are self-supporting and others of which are not, may also be used. Those which are not self-supporting may be extended between upper and lower frames 12 and 13 by any conventional filament tensioning means. Similarly, filaments 15 could be replaced by hollow tubes extending between frames 12 and 13, which could later be replaced by the desired filaments after the X and Y axis filaments have been woven in the manner to be described below.

Adjacent upper and lower frames 12 and 13 and filaments 15 are two essentially identical filament feed units generally referenced 20 and 20'. Since the structure and operation of these units are essentially identical, this description will be limited to the yarn feed unit 20 for the X axis, it being understood that the yarn feed unit 20' operates in a similar manner on the Y axis.

Supple filament 21 is fed under tension from bobbins (not shown) to each of a plurality of parallel, equally spaced needles 22, which are mounted in needle bar 23 and extend through needle spacer 24. Needle bar 23 is connected to two parallel push rods 25, which are reciprocally journalled in yoke assembly 26. Stop plate 27 limits the forward travel of push rods 25 in yoke assembly 26 in a manner to be described below. Yoke assembly 26 is supported above base 10 by uprights 28.

In operation, lower frame 13 is adjusted to a convenient working height above base 10 by manipulating positioning means 14 on uprights 11. Upper frame 12 is then positioned at a convenient working height relative to lower frame 12 so as to maintain filaments 15 in their vertically aligned, spaced orientation. Filaments 15 are then inserted through the hole of upper frame 12 and into the recesses of lower frame 13. Once filaments 15 are in place, filament 21 can be woven into filaments 15 from filament feed units 20 and 20'.

To accomplish this, filaments 21 are first threaded into each of needles 22 and then grouped and tightly secured to a typing-off hook (not shown) on the undersurface of lower frame 13. Needles 22 and their threaded filaments 21 are then woven through the spaced rows between filaments 15 along the X axis to extend beyond the opposite side of filaments 15 by advancing the push rods 25 until stop plate 27 reaches the yoke assembly 26. A pin 30 is inserted so as to lie across the top of the filaments 21 just outside the last row of filaments 15, the pin 30 lying in the Y-axis direction. Pin 30 is manipulated downwardly so as to tamp filaments 21 down against the upper surface of lower frame 13. Needles 22 (which are above pin 30) are then retracted from the filaments 15 to their starting position, thus forming a tightly looped first course of X-axis filaments which is restrained by pin 30 at the far outside edge of filaments 15.

Following this, the first course of Y-axis yarn is woven into the filaments 15 by advancing threaded needles 22' in the same manner as previously described, inserting pin 30' on top of filament 21' immediately outside the last row of filaments 15 in the X-axis direction and withdrawing needles 22' to their start position. In this manner, the first course of Y-axis filament (the second course of filaments in the X–Y plane) is laid on top of the X-axis course and packed tightly downwards against the X-axis filament course to maximize the pressure of the close touching contact of X, Y and Z-axis filaments at their points of intersection.

Following this, the filament feed units 20 and 20' are alternately operated in the same manner, until a three-dimensional network of X, Y and Z yarn of the desired height is built up on the Z-axis filaments 15. As the filament layers build up, it will be obvious that the pins 30 and 30' may be removed and inserted in the higher newly formed courses of filament, since they are no longer needed to hold in place the lower courses of the structure. The adjacent layers prevent the courses in the lower part of the structure from being undone. In this manner pins 30 and 30' can be removed and used over again, thus reducing the number of pins required for the operation.

It is important to emphasize that filaments 21 and 21' should be fed under tension and packed tightly against the adjacent filaments in the X, Y and Z-axes to insure maximum inter-yarn friction between adjacent filaments. The strength of the build up structure depends principally upon this inter-yarn friction; the importance of maximizing it is therefore apparent.

It should also be understood that other filament weaving configurations may be used. For example, the apparatus described above allows a weave pattern where an X-axis filament course is overlapped and sandwiched between by a Y-axis course. This would be done by extending the Y-axis needles 22' through filaments 15, thus weaving a single layer of Y-axis filament 21' into filament 15, and then extending and retracting the X-axis needles in the above described manner to weave an overlapped double layer of filaments 21 on the X-axis into filaments 15 on top of single layer of filaments 21', and then retracting needles 22' to weave a single layer of filaments 21' on the Y-axis on top of the double layer of filaments 21 on the X-axis.

Figure 2:
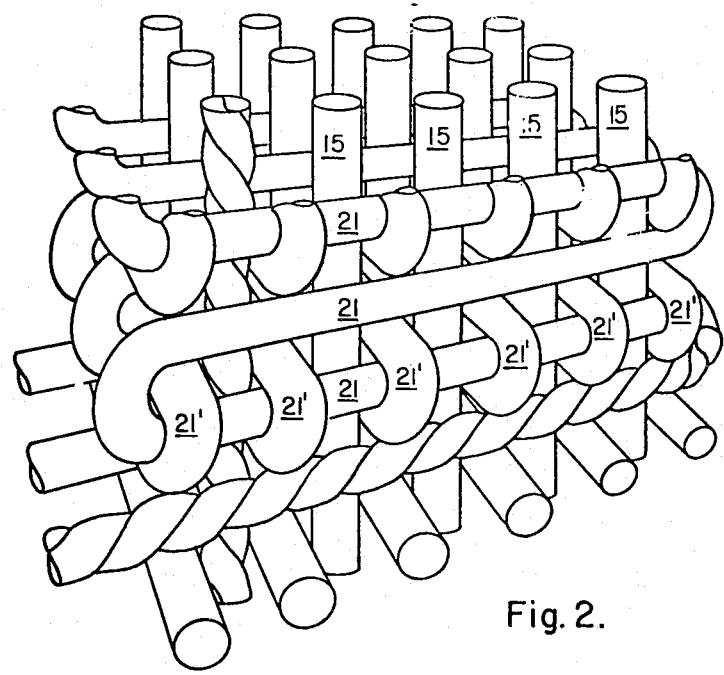
FIG. 2 is an enlarged perspective view of a structural fabricated in accordance with this invention on a loom of the type shown in FIG. 1.

Similarly, a multiple shuttle-type loom could be used whereby single-layer X-axis and Y-axis courses could be laid on top of each other. Such a woven structure is illustrated in FIG. 2. This would require a loom having oppositely disposed banks of X-axis and Y-axis needles on either side of the Z-axis filaments, and a suitable filament transfer system on each bank of needles to permit transfer of the filament between the opposite banks as the needles traverse the Z-axis. Still more sophisticated looms have been designed to interlace, rather than simply overlap these filaments.

Also, while the looms thus far considered in detail have only X-axis and Y-axis courses woven on the Z-axis, it should be understood that these courses need not be woven perpendicular to each. Nor is it necessary for the Z-axis filaments to be aligned vertically and parallel to each other. Diverging and converging Z-axis filaments have been successfully used to weave conical shapes. Also, less than or more than the two above-described courses can be woven into the X–Y axes network, e.g. all courses on the X-axis, or more than two courses woven in at 30°, 60°, and/or other angular intervals in the X–Y plane into the Z-axis filaments.

Other loom designs are available, and others will become available, which can produce still different weaving configurations. These designs do not, however, depart from the basic principles of the materials and processes which are described herein.

After sufficient layers of filament have been woven in the above-described manner to produce a structure of the desired overall dimensions, it is preferably compressed along the Z-axis. This increases the density and inter-yarn friction of the finished material. Compression may be accomplished in any conventional manner. One suitable method is to employ a compression member having, a plurality of parallel slats which are sized and positioned to fit between the rows of Z-axis filaments 15. This member is then applied to the structure as by a conventional tie bolt arrangement to lower frame 13, so as to force the slats downwardly between the adjacent rows of Z-axis filaments 15. The slats in turn force the X-axis and Y-axis filaments downwardly into a far more compact and denser structure.

Another compression technique which has been found suitable is to use a heat shrinkable filament such as Nylon or Rayon. After the structure is woven with this filament, it is simply heated in order to shrink and thereby compress it.

Compression is, however, not essential. The structure is sufficiently compact and dense for certain applications without compression. In this regard, it should be noted that the structure can be woven by the above-described method to produce a very compact composite having a density before compression of 30% or greater of the density of the filaments making up the composite structure. For more demanding uses, however, compression of the structure is desirable.

After the structure is compressed, it is removed from the apparatus of FIG. 1 by raising upper frame 12 off the uprights 11 and lifting it off and away from the lower frame 12. The woven structure which will now be referred to as a billet, is then impregnated with a suitable plastic or resin material in order to fix the filaments in their woven orientation in the manner now described.

Figure 3:
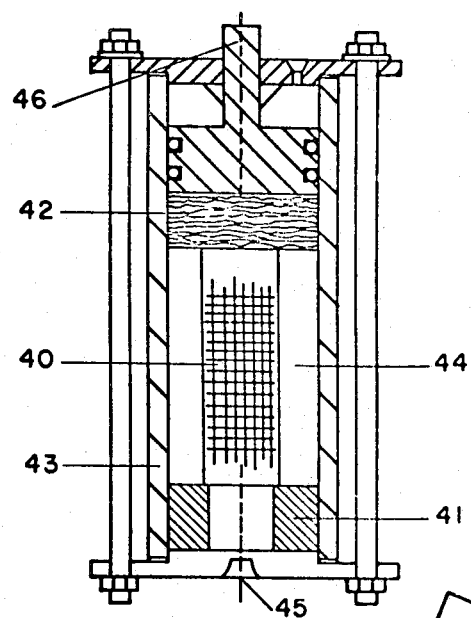
FIG. 3 is a cross-sectional elevation of an apparatus for impregnating the structure shown in FIG. 2.

Referring to FIG. 3, billet 40 rests on support blocks 41 under a liquid resin bath 42 in a conventional pressure cylinder 43. Liner 44 encloses billet 40. A vacuum is drawn by usual means in cylinder 43 through vacuum port 45. At the same time, piston 46 presses resin bath 42 downwardly against billet 40. The combined action of the evacuation of cylinder 43 and pressure from piston 46 causes the resin to thoroughly impregnate billet 40, filling in the interstices between adjacent filaments.

After structure 40 is fully impregnated in this manner, it is then cured so as to form a solid billet which may be machined to the desired shape and dimensions.

Figure 4:
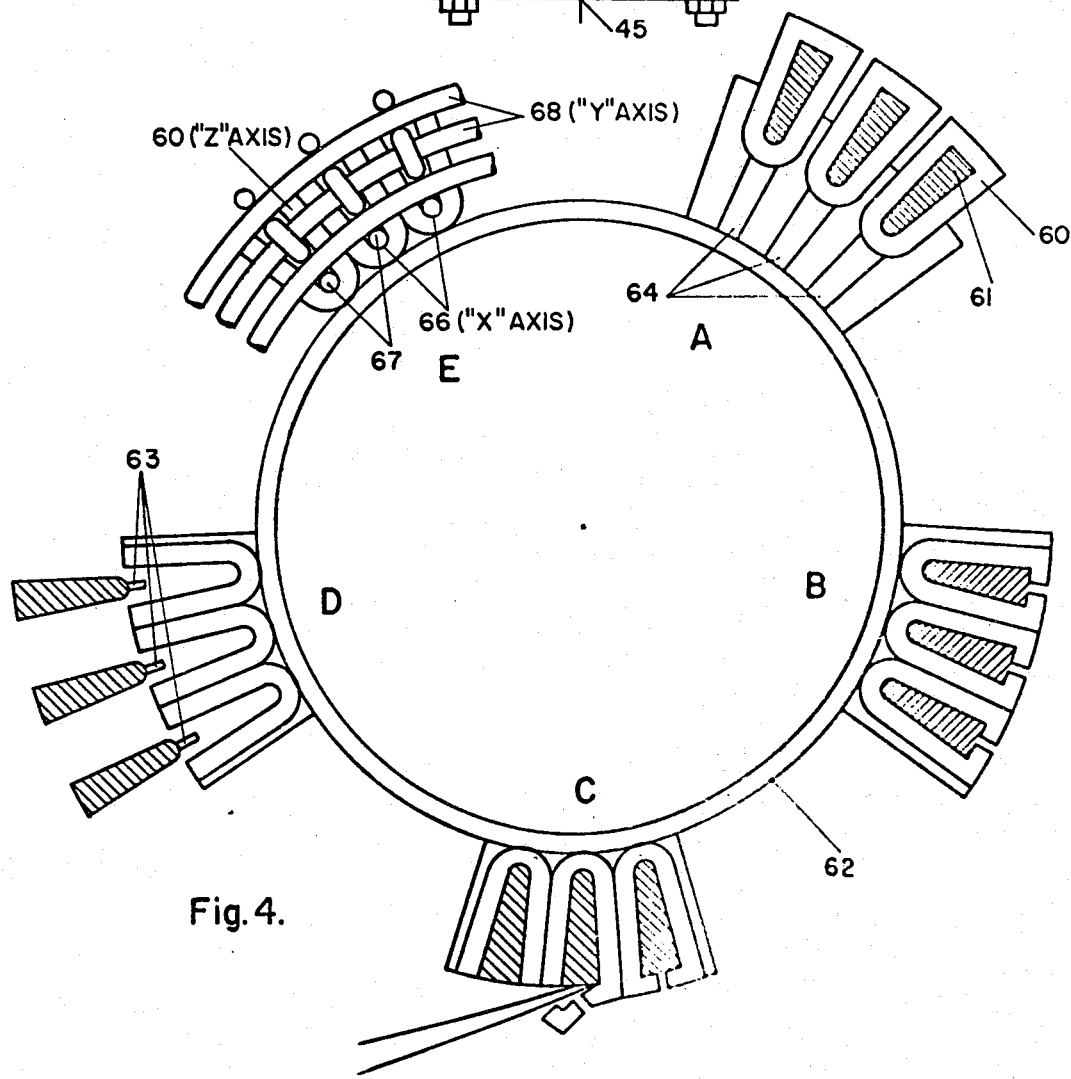
FIG. 4 is a schematic of cylindrical weaving apparatus for practicing this invention, the schematic being broken into parts showing the sequence of fabrication steps.

Referring now to FIGS. 4 through 8, there is illustrated another form of this invention as applied to fabricating cylindrical shapes. FIG. 4 is broken into parts to show the sequential steps of the cylindrical fabrication operation as will be explained below.

Figure 5:
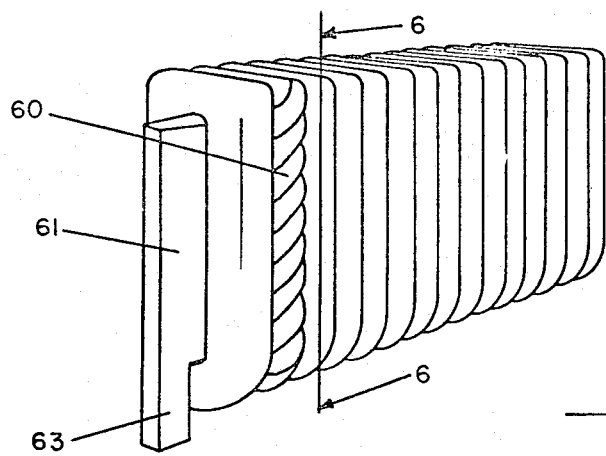
FIG. 5 is a perspective view of a single wound slat element of the cylindrical weaving apparatus shown in FIG. 4.
Figure 6:
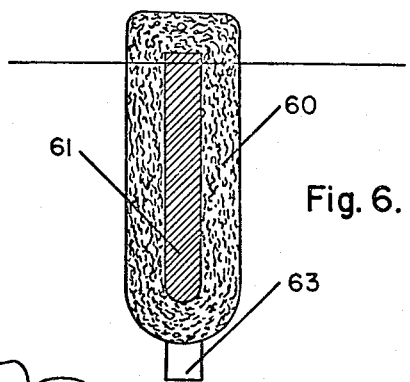
FIG. 6 is a cross-sectional view of the element shown in FIG. 5 taken at section line 6—6.

Referring to FIGS. 5 and 6, the first step in the cylindrical shape generation is to wind a prepreg (pre-impregnated) type filament 60 about pre-shaped slats 61 in the manner there shown. The prepreg filament may be any type of pre-impregnated filament which hardens to a machinable material upon curing, such as a quartz-phenolic filament. The slats 61 may be made of metal or plastic or any other suitable rigid material, preferably one which is freely releasable from the cured prepreg filament material. The pre-wound slats 61 are then assembled in a radial orientation on the circumferential surface of a mandrel 62 (see FIG. 4, Sect. A). Preferably, slats 61 are provided with extensions 63 which fit into mating slots 64 in the mandrel 62 for precise location and orientation of slats 61 relative to the mandrel 62. The pre-wound slats 61 and mandrel 62 are sized and positioned relative to each other such that the thickness of the filament windings and slat cross-section is slightly greater than the chordal thickness of the space between adjacent slats 61 on the mandrel 62. Thus, when two adjacent pre-wound slats 61 are positioned in place on mandrel 62, the windings of one slat 61 are compressed into and become interwoven with the windings of the next adjacent slats 61.

After slats 61 are assembled on the mandrel 62, the filaments 60 are severed across their outer peripheral surface on each slat 61 (FIG. 4, Sect. B), thus releasing the tension in the windings and allowing the individual filaments 60 from adjacent windings to become more intermingled and interwoven with each other. The entire mandrel/slat assembly is then cured so as to harden the filaments 60 of each slat 61 into rigid, machinable material.

Following this, the outer cylindrical surface of the mandrel/slat assembly is machined away (FIG. 4, Sect. C) to free slats 61 from their respective windings 60, and thus permit removal of the slats 61 from the assembly (FIG. 4, Sect. D).

Figure 7:
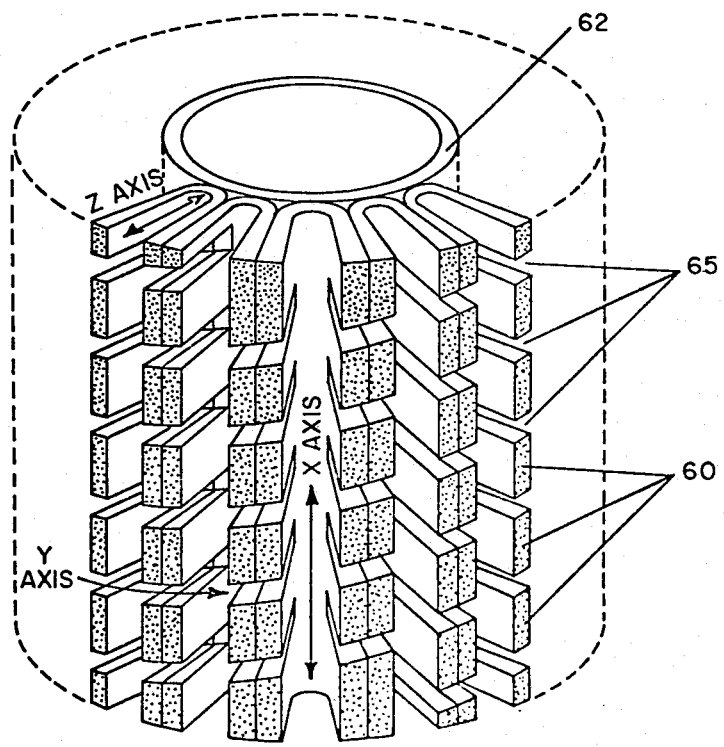
FIG. 7 is a perspective view of the apparatus shown in FIG. 4.

Referring now to FIG. 7, after the slats 61 are removed, helical grooves 65 are machined into the roughly cylindrically shaped outwardly extending extremities of filaments 60. This helical groove machining operation could be performed either before of after the slats 61 are removed from filaments 60, it being preferred to be done after, since this permits slats 61 to be re-used.

After helical grooves 65 have been cut into the generally cylindrical outer surface, the cylinder is then ready to be woven in a manner similar to the above-described process. The outwardly extending U-shaped filaments 60 of mandrel 62 correspond to the Z-axis filaments (See FIG. 4, Sect. E). The rows 66 between filaments 60, which are formed when the slats 61 are removed, define the X-axis path for the longitudinal windings 67 of the cylinder. The helical grooves 65 define the Y-axis path for circumferential windings 68 of the cylinder.

In operation, a first X-axis course of filaments 67 is woven into filaments 60. Following this, a Y-axis course of filaments 68 is woven into filaments 60 on top of filaments 67. Alternating courses of X and Y-axes filaments are woven into filaments 60 in much the same manner as described above until a cylindrical shape of the desired dimensions is produced.

Figure 8:
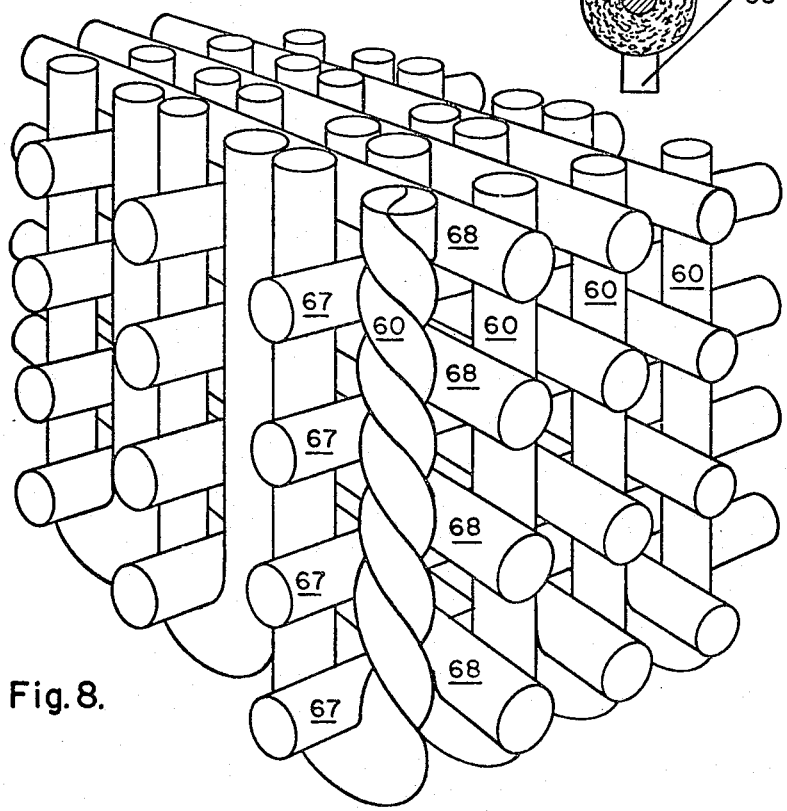
FIG. 8 is an enlarged view of a structure fabricated on an apparatus of the type shown in FIG. 4.

This cylindrical structure may then be compressed and impregnated in a manner similar to that described above. A section of an example of a completed structure is illustrated in FIG. 8.

The cylindrical method can be readily adapted to weave cones, spheres, rounded tips and the like. Basically, it only requires the orienting of radial filaments in what is to become the curved shell of the structure. These oriented filaments are then criss-crossed with filaments in the other courses until the rough shape of the final structure is obtained. This woven structure is then compressed along the axis of the radials and/or cured, and then machined to final dimensions.

It will be obvious that a limitless variety of impregnated woven materials and matrices can be made in a limitless variety of shapes in accordance with this invention. Therefore, although particular embodiments are described above, other embodiments using other variations, features and modifications will undoubtedly occur to those skilled in the art, all of which may be achieved without departing from the spirit and scope of the invention as defined by the following claims.

I claim:

1. A method for fabricating a three-dimensional structure having a curved surface comprising:
   a. orienting a first group of filaments to extend radially through the space corresponding to the shell of the curved surface, such filaments being sized and spaced to form a first set of rows, such filaments also being sized and spaced in said first set of rows to form a second set of rows which intersects the first set,
   b. weaving into said first group of filaments along the first set of rows a second group of filaments,
   c. weaving into said first group of filaments along the second set of rows a third group of filaments contiguous with the woven second group of filaments,
   d. such filaments being sized and spaced relative to each other such that the filaments of each group are in close frictional contact with the filaments of each other group,
   e. repetitively weaving such second and third group filaments into the first group in said manner to form the curved three-dimensional structure of the desired shape; and
   f. compressing the contiguous X and Y axis filament along the Z axis into close meshing contact with each other and with the Z axis filaments, and impregnating said structure with cure-hardenable liquid matrix substance, and curing said impregnated structure to a hardened state.

2. A method for fabricating a three-dimensional structure having a curved surface as claimed in claim 1, wherein said first group filament orienting step comprises:
   a. wrapping pre-impregnated filament around a plurality of separate relatively thin, generally rectangular forms,
   b. mounting the wrapped forms radially in a holding means, the size and shape of the forms and holding means and the number of windings on said forms being selected to provide a tightly packed shell corresponding to the dimensions of the shell of the finished structure,
   c. severing the filaments at their edges corresponding to the surface of the structure,
   d. curing the filaments to a hardened state,
   e. removing the form from said filaments, the resulting recesses forming and first set of rows, and
   f. forming the second set of rows in said filaments by matching rows into the peripheries of said hardened filaments.

* * * * *

UNITED STATES PATENT OFFICE
CERTIFICATE OF CORRECTION

PATENT NO. : 3,904,464
DATED : September 9, 1975
INVENTOR(S) : Robert W. King

It is certified that error appears in the above–identified patent and that said Letters Patent are hereby corrected as shown below:

Column 2, line 45, please change "structural" to "structure".

Column 8, line 29, please change "and" to "the".

Column 8, line 31, please change "matching" to "machining".

Signed and Sealed this twenty-fifth Day of November 1975

[SEAL]

Attest:

RUTH C. MASON
Attesting Officer

C. MARSHALL DANN
Commissioner of Patents and Trademarks